United States Patent
Lindstrom

(10) Patent No.: US 12,024,005 B2
(45) Date of Patent: Jul. 2, 2024

(54) BATTERY CELL CARRIER AND ENCLOSURE FOR STACK ASSEMBLY COMPRISING MULTIPLE BATTERY CELL CARRIERS

(71) Applicant: CORVUS ENERGY INC., Richmond (CA)

(72) Inventor: Jeremy Lindstrom, Richmond (CA)

(73) Assignee: CORVUS ENERGY INC., Richmond (CA)

( * ) Notice: Subject to any disclaimer, the term of this patent is extended or adjusted under 35 U.S.C. 154(b) by 1263 days.

(21) Appl. No.: 16/095,274

(22) PCT Filed: Apr. 20, 2017

(86) PCT No.: PCT/CA2017/050491
§ 371 (c)(1),
(2) Date: Oct. 19, 2018

(87) PCT Pub. No.: WO2017/181284
PCT Pub. Date: Oct. 26, 2017

(65) Prior Publication Data
US 2020/0358057 A1   Nov. 12, 2020

Related U.S. Application Data

(60) Provisional application No. 62/325,390, filed on Apr. 20, 2016.

(51) Int. Cl.
*B60K 1/04* (2019.01)
*H01M 10/613* (2014.01)
(Continued)

(52) U.S. Cl.
CPC ............. *B60K 1/04* (2013.01); *H01M 10/613* (2015.04); *H01M 10/625* (2015.04);
(Continued)

(58) Field of Classification Search
CPC .... B60K 1/04; H01M 10/313; H01M 10/625; H01M 10/6554; H01M 50/116; H01M 50/264; H01M 50/211; H01M 50/291
(Continued)

(56) References Cited

U.S. PATENT DOCUMENTS 6,296,967 B1 * 10/2001 Jacobs ................ H01M 50/209
429/93
8,815,429 B2 * 8/2014 Hostler ............ H01M 10/6553
429/120
(Continued)

FOREIGN PATENT DOCUMENTS

| CN | 101006581 A | 7/2007 |
|---|---|---|
| CN | 203950846 U | 11/2014 |

(Continued)

OTHER PUBLICATIONS

International Search Report and Written Opinion issued in related International Application No. PCT/CA2017/050491 dated Jul. 25, 2017.
(Continued)

*Primary Examiner* — Raheena R Malik
(74) *Attorney, Agent, or Firm* — Michele V. Frank; Venable LLP

(57) ABSTRACT

A battery module includes an enclosure that has at least one heat sink. Within the module is a stack assembly composed of a series of cell carrier assemblies connected together. The cell carrier assemblies each include a cell carrier that has a first spring that is biased against the heat sink. Each of the cell carrier assemblies also includes a battery cell and a heat conductive sheet that is thermally coupled to the battery cell. The heat conductive sheet is positioned to be pressed against the heat sink by the first spring to facilitate a good thermal connection between the sheet and the heat sink. Heat is
(Continued)

accordingly conducted away from the battery cell, along the heat conductive sheet, to the heat sink.

17 Claims, 17 Drawing Sheets

(51) Int. Cl.
  *H01M 10/625* (2014.01)
  *H01M 10/6554* (2014.01)
  *H01M 50/211* (2021.01)
  *H01M 50/264* (2021.01)
  *H01M 50/291* (2021.01)

(52) U.S. Cl.
  CPC ..... *H01M 10/6554* (2015.04); *H01M 50/211* (2021.01); *H01M 50/264* (2021.01); *H01M 50/291* (2021.01)

(58) Field of Classification Search
  USPC ........................................................ 165/80.3
  See application file for complete search history.

(56) References Cited

U.S. PATENT DOCUMENTS

| | | | |
|---|---|---|---|
| 9,634,295 B2* | 4/2017 | Dube | H01M 10/0481 |
| 10,374,272 B1* | 8/2019 | Dellon | H01M 50/213 |
| 2004/0081884 A1 | 4/2004 | Bean et al. | |
| 2005/0221177 A1* | 10/2005 | Amagai | H01M 10/0413 |
| | | | 429/186 |
| 2009/0325059 A1* | 12/2009 | Niedzwiecki | H01M 50/211 |
| | | | 429/152 |
| 2011/0200862 A1* | 8/2011 | Kurosawa | H01M 10/6557 |
| | | | 429/120 |
| 2011/0293983 A1* | 12/2011 | Oury | H01M 10/647 |
| | | | 429/120 |
| 2012/0009455 A1* | 1/2012 | Yoon | H01M 10/613 |
| | | | 429/120 |
| 2012/0251865 A1 | 10/2012 | Heckenberger et al. | |
| 2013/0004822 A1 | 1/2013 | Hashimoto et al. | |
| 2013/0196195 A1 | 8/2013 | Nguyen et al. | |
| 2014/0154535 A1* | 6/2014 | Olsson | H01M 50/394 |
| | | | 429/53 |
| 2014/0186693 A1* | 7/2014 | Tyler | H01M 50/103 |
| | | | 429/186 |
| 2015/0037616 A1* | 2/2015 | Wyatt | H01M 10/6555 |
| | | | 429/153 |
| 2015/0037662 A1* | 2/2015 | Pinon | H01M 50/10 |
| | | | 429/179 |
| 2015/0118537 A1* | 4/2015 | Obasih | H01M 50/20 |
| | | | 429/120 |
| 2015/0180095 A1* | 6/2015 | Chen | H01M 10/6554 |
| | | | 429/120 |
| 2015/0180096 A1 | 6/2015 | Schwab et al. | |

FOREIGN PATENT DOCUMENTS

| | | |
|---|---|---|
| CN | 104733798 A | 6/2015 |
| CN | 205016642 U | 2/2016 |
| EP | 2200109 A2 | 6/2010 |
| EP | 2200109 A3 | 7/2010 |
| EP | 2474061 A1 | 7/2012 |
| EP | 2843741 A1 | 3/2015 |
| JP | H11-176403 A | 7/1999 |
| JP | 2003-257391 A | 9/2003 |
| JP | 2004-185933 A | 7/2004 |
| JP | 2008-306010 A | 12/2008 |
| JP | 2014-220087 A | 11/2014 |
| JP | 2014-229559 A | 12/2014 |
| JP | 2015-141887 A | 8/2015 |
| JP | 2017-004676 A | 1/2017 |
| KR | 10-2012-0083375 A | 7/2012 |
| KR | 10-2013-0004141 A | 1/2013 |
| KR | 20-2014-0002779 U | 5/2014 |
| WO | 2006/020332 A1 | 2/2006 |
| WO | 2011/023823 A1 | 3/2011 |
| WO | 2013/025595 A1 | 2/2013 |
| WO | 2013/025608 A1 | 2/2013 |

OTHER PUBLICATIONS

Extended European Search Report issued in related European Patent Application No. 17785206.8 dated Nov. 21, 2019.

* cited by examiner

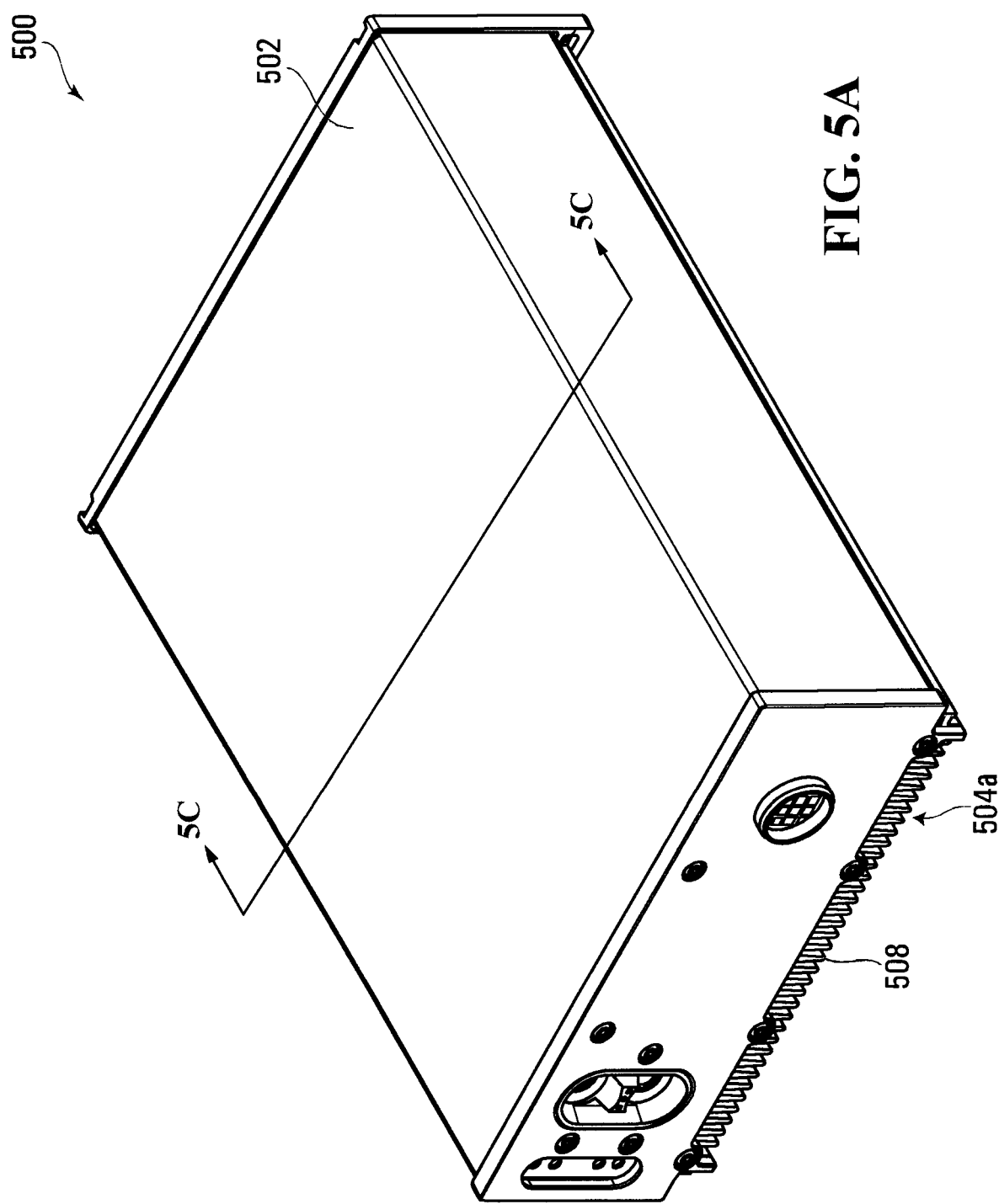

BATTERY CELL CARRIER AND ENCLOSURE FOR STACK ASSEMBLY COMPRISING MULTIPLE BATTERY CELL CARRIERS

CROSS-REFERENCE TO RELATED APPLICATIONS

This application is a National Phase of International Application No. PCT/CA2017/050491, filed Apr. 20, 2017, which claims priority to U.S. Provisional Patent Application No. 62/325,390, filed Apr. 20, 2016, the entire contents of each of which are hereby incorporated by reference in their entirety.

TECHNICAL FIELD

The present disclosure is directed at a battery cell carrier and an enclosure for a stack assembly comprising multiple battery cell carriers.

BACKGROUND

Fossil fuels continue to be displaced as an energy source in both industrial and consumer uses. One way in which fossil fuels are being displaced is by replacing internal combustion engines with electric motors. Replacing an internal combustion engine with an electric motor typically involves swapping a fuel tank for battery modules, with the battery modules providing the electricity required to operate the electric motor.

A battery module typically comprises multiple battery cells electrically connected in one or both of series and parallel. One example type of battery cell is a "pouch cell" in which the rigid exterior of a conventional battery cell is replaced with a flexible pouch. Flexible and electrically conductive tabs extend from an edge of the pouch and are welded to the cell's electrodes, which are contained within the pouch; these tabs allow the cell to be electrically connected to a load. Pouch cells often have a lithium polymer battery chemistry.

Swapping the rigid exterior of a conventional battery cell for a flexible pouch reduces the weight of the battery module but reduces the inherent structural integrity of the cell. To compensate for this decrease in integrity, each of the pouch cells in a battery module typically rests within a battery cell carrier, and the battery cell carriers are physically coupled together to form a stack assembly that has sufficient structural integrity for practical use. The stack assembly is housed within an enclosure, which protects the stack assembly from the environment.

SUMMARY

According to a first aspect, there is provided a cell carrier, comprising a cell compartment for receiving a battery cell, and a first spring coupled to the cell compartment.

The first spring may extend past the periphery of the cell compartment.

The cell compartment may comprise a rigid backing, and a raised edge extending from the rigid backing and at least partially delimiting the cell compartment.

The cell carrier may further comprise second spring coupled to the cell compartment. The second spring may extend past the periphery of the cell compartment.

The cell compartment may comprise multiple sides and the first and second springs may extend past different sides of the cell compartment.

The first spring may comprise a cantilevered spring.

The first spring may extend continuously along a side of the cell compartment.

The first spring may comprise a cantilevered portion affixed at one end to the cell compartment, and an actuator portion affixed at another end of the cantilevered portion at a fulcrum.

The second spring may comprise a cantilevered spring.

The second spring may extend continuously along a side of the cell compartment.

The second spring may comprise a cantilevered portion affixed at one end to the cell compartment, and an actuator portion affixed at another end of the cantilevered portion at a fulcrum.

According to another aspect, there is provided a cell carrier assembly. The cell carrier assembly comprises a cell carrier that comprises a cell compartment for receiving a battery cell and a first spring coupled to the cell compartment. The cell carrier assembly further comprises a battery cell located within the cell compartment and a first heat conductive sheet thermally coupled to the battery cell and extending past the first spring.

The first spring may extend past the periphery of the cell compartment.

The first heat conductive sheet may directly contact the battery cell.

The first heat conductive sheet may be between the cell carrier and the battery cell.

The first heat conductive sheet may be on a surface of the battery cell facing away from the cell carrier.

The cell compartment may comprise a rigid backing and a raised edge extending from the rigid backing and at least partially delimiting the cell compartment.

The cell carrier assembly may further comprise a second spring coupled to the cell compartment.

The second spring may extend past the periphery of the cell compartment.

The cell compartment may have multiple sides and the first and second springs may extend past different sides of the cell compartment. A second heat conductive sheet may be thermally coupled to the battery cell and extend past the second spring.

The second heat conductive sheet may directly contact the battery cell.

The second heat conductive sheet may be between the cell carrier and the battery cell.

The second heat conductive sheet may be on a surface of the battery cell facing away from the cell carrier.

The first spring may comprise a cantilevered spring.

The first spring may extend continuously along a side of the cell compartment.

The first spring may comprise a cantilevered portion affixed at one end to the cell compartment, and an actuator portion affixed at another end of the cantilevered portion at a fulcrum.

The second spring may comprise a cantilevered spring.

The second spring may extend continuously along a side of the cell compartment.

The second spring may comprise a cantilevered portion affixed at one end to the cell compartment and an actuator portion affixed at another end of the cantilevered portion at a fulcrum.

According to another aspect, there is provided a heat sink comprising a layer of thermal interface material, and a cooling plate thermally coupled to the layer thermal interface material.

The layer thermal interface material and the cooling plate may be in direct contact.

The heat sink may further comprise a spreading plate located between the layer of thermal interface material and the cooling plate, and an additional layer of thermal interface material located between the spreading plate and the cooling plate.

The cooling plate may comprise fins.

The cooling plate may comprise a plugged channel containing phase change material therein.

The cooling plate may comprise a pair of coolant ports accessible from outside the heat sink, and a coolant conduit contained within the heat sink. The coolant conduit fluidly may be coupled the coolant ports.

The heat sink may further comprise a lip recessed from an inner surface of the cooling plate, wherein the coolant conduit is open and recessed from the lip, and a coolant sealing plate dimensioned to fit on the lip and to seal the coolant conduit when compressed against the lip.

According to another aspect, there is provided a battery module comprising a stack assembly comprising multiple instances of any of the above aspects of the cell carrier or suitable combinations thereof and a stack enclosure in which the stack assembly is contained. The stack enclosure may comprise a housing and a heat sink of any of the above aspects of the heat sink or suitable combinations thereof coupled to the housing. The stack assembly is positioned within the heat sink such that the first heat conductive sheet contacts the heat sink. The battery module further comprises a compression mechanism that compresses the stack assembly against the heat sink such that the first spring of each of the cell carrier assemblies is biased against the heat sink.

The compression mechanism may comprise the side walls of the housing under tension. Additionally or alternatively, the compression mechanism may comprise threaded tie rods and accompanying nuts, a clamp (camming or non-camming), and a band whose ends are fastened to the heat sink and that is wrapped around the stack assembly.

The battery module may comprise an additional heat sink that is opposite the first heat sink. The side walls may be detachably couplable to one or both of the heat sinks. For example, each of the side walls may comprise a first lip and each of the heat sinks may comprise a second lip matable with the first lip and positioned to permit the side walls and heat sinks to be secured together. The side walls may be dimensioned so as to be under tension, thereby compressing the stack assembly, when the stack assembly is located within the housing and the one or more heat sinks and side walls are secured together.

The stack assembly may comprise the second heat conductive sheet and the second spring, and the compression mechanism may compress the stack assembly against the heat sink such that the second spring of each of the cell carrier assemblies is biased against the heat sink.

According to another aspect, there is provided a battery module comprising a stack assembly comprising multiple instances of any of the above aspects of the cell carrier or suitable combinations thereof and a stack enclosure in which the stack assembly is contained. The stack enclosure may comprise a housing comprising side walls and a heat sink of any of the above aspects of the heat sink or suitable combinations thereof coupled to the housing. The stack assembly may be positioned within the heat sink such that the first heat conductive sheet contacts the heat sink, and the side walls of the housing may be dimensioned to compress the stack assembly into the heat sink when the housing and heat sink are coupled together.

Each of the side walls may comprise a first lip and the heat sink may comprise a pair of second lips of which each is matable with the first lip to secure the housing and heat sink together.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIG. 5A is a top perspective view of one example embodiment of a stack assembly enclosure for use with the stack assembly of FIG. 3.

DETAILED DESCRIPTION

One concern when operating a battery module relates to the operating temperature of the module. If the temperature of the battery module exceeds a maximum safe operating temperature that is specified, for example, by the module's manufacturer, then one or both of operating efficiency of the module and safety may be compromised. Chronically operating the battery module at overly high temperatures may decrease the lifetime of the module and may result in reduced performance of the module even during the module's shortened lifetime. Additionally, operating the module at an overly high temperature may result in explosion or "thermal runaway" of the module, which can be catastrophic.

The embodiments described herein are of a battery cell carrier and an enclosure for a stack assembly comprising multiple battery cell carriers that are designed to transfer heat away from the battery cells that comprise the battery module, thereby helping to maintain the operating temperature of the module within a safe and specified range.

Figure 1A:
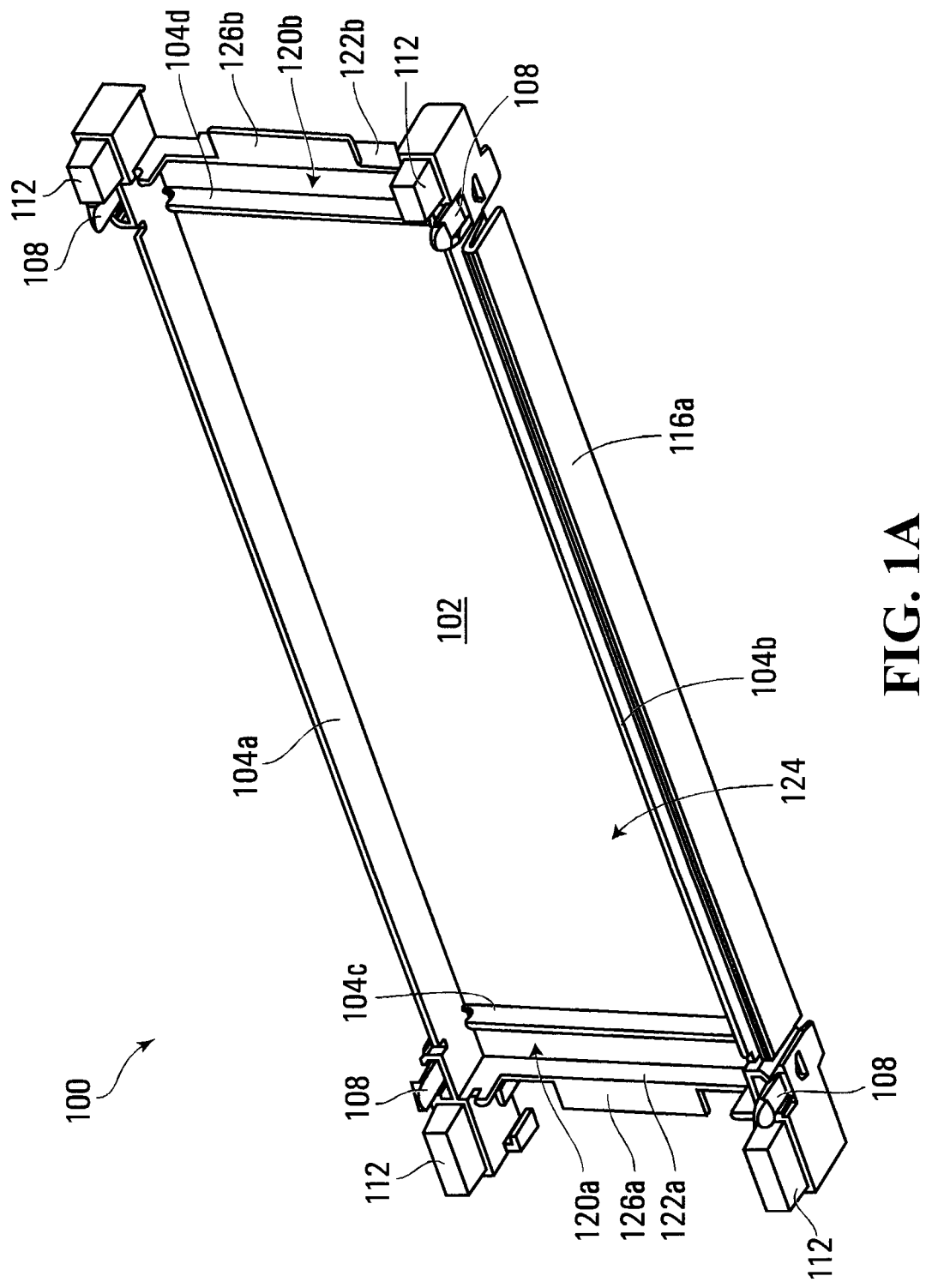
FIG. 1A is a front perspective view of one example embodiment of a cell carrier.
Figure 1B:
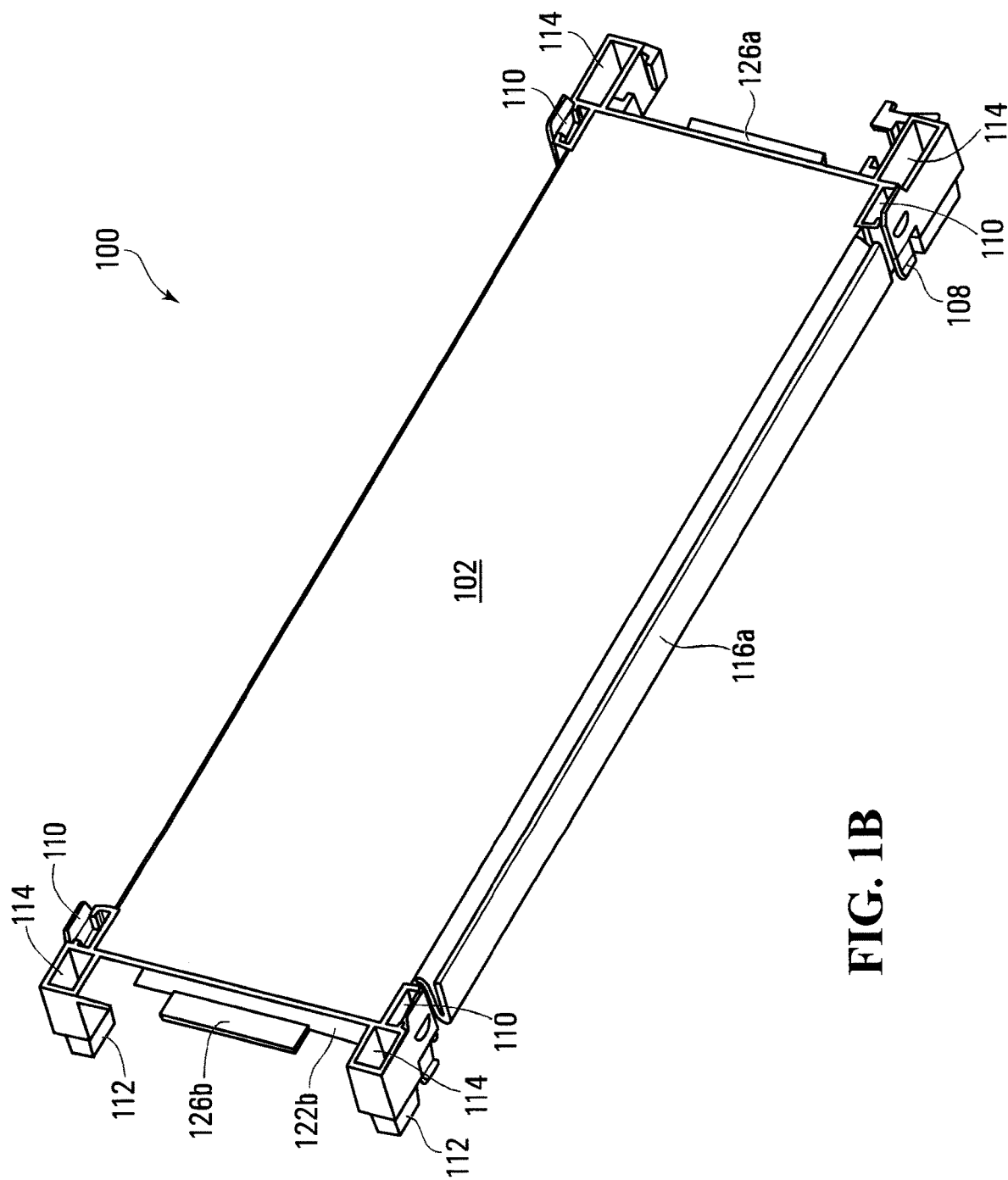
FIG. 1B is a rear perspective view of the cell carrier of FIG. 1A.

Referring now to FIGS. 1A and 1B, there are respectively shown front perspective and rear perspective views of one embodiment of the cell carrier 100. The cell carrier 100 comprises a backing 102 against which a pouch cell 118 (shown in FIG. 1C) is secured. The backing 102 may be relatively rigid for the purposes of structural integrity, or alternatively may be relatively flexible. The securing of the pouch cell 118 may be done, for example, by any one or more of using an adhesive that secures the cell 118 to the backing 102, clamping of the cell 118 against the backing 102 by a clamping mechanism (not shown), and compression of the cell 118 against the backing 102 by neighboring cell carriers 100 when the cell carrier 100 comprises part of a stack assembly 300 (shown in FIG. 3). Extending perpendicularly from the front side of the backing 102 are a top wall 104a extending along the backing's 102 top edge, a bottom wall 104b extending along the backing's 102 bottom edge, a left wall 104c extending across a left portion of the backing 102, and a right wall 104d extending along a right portion of the backing 102; these four walls 104a-d collectively delimit a cell compartment 124 for receiving the pouch cell 118.

A leftmost wall 122a extends along the backing's 102 left edge, and the leftmost wall 122a, left wall 104c, top wall 104a, and bottom wall 104b collectively delimit a first tab compartment 120a that is positioned to receive a foil tab that comprises part of the pouch cell 118 and that is electrically connected to one of the cell's 118 electrodes. Extending leftwards from the leftmost wall 122a is a first tab platform 126a for supporting part of the foil tab that is otherwise contained in the first tab compartment 120a. Similarly, a rightmost wall 122b extends along the backing's 102 right edge, and the rightmost wall 122b, right wall 104d, top wall 104a, and bottom wall 104b collectively delimit a second tab compartment 120b that is positioned to receive another of the pouch cell's 118 foil tabs that is electrically connected to the other of the cell's 118 electrodes. Extending rightwards from the rightmost wall 122b is a second tab platform 126b for supporting part of the foil tab that is otherwise contained in the second tab compartment 120b.

Each corner of the cell carrier 100 comprises a carrier coupling mechanism for coupling the cell carrier 100 to a neighboring cell carrier 100 located in front of or behind the cell carrier 100. The two carrier coupling mechanisms connected to the left corners of the carrier 100 ("left corner carrier coupling mechanisms") are identical. Each of these carrier coupling mechanisms comprises a tab 108 extending forwards and an adjacent slot 110 with a notch in its side wall to detachably couple with the tab 108 of a neighboring cell carrier 100. To the left of the tab 108 and slot 110 is a forwardly extending protrusion 112 behind which is a recess 114 for receiving and forming an interference fit with the protrusion 112 of a neighboring cell carrier 100. The two carrier coupling mechanisms connected to the right corners of the carrier 100 ("right corner carrier coupling mechanisms") are also identical and mirror the left corner carrier coupling mechanisms, except that the protrusions 112 and recesses 114 of the right corner carrier coupling mechanisms are smaller than those of the left corner carrier coupling mechanisms.

Extending on an outer surface of the bottom wall 104b is a first spring 116a. In the depicted embodiment, the spring 116a comprises a curved cantilevered portion 128 that is affixed at one end to the outer surface of the bottom wall 104b. A substantially flat actuator portion 130 is affixed to the other end of the cantilevered portion 128 at a flexible fulcrum and is designed to be compressed by virtue of contact with the stack assembly enclosure, as discussed in more detail below.

While one particular embodiment of the spring 116a is depicted, in different embodiments (not depicted) the spring 116a may be differently designed. For example, the spring 116a may extend intermittently, as opposed to continuously, along the bottom wall 104b; that is, the spring 116a may comprise a series of discrete spring portions, each of which may be independently compressed. In another different embodiment (not depicted), the spring 116a may comprise a different type of spring, such as a coil spring. In another different embodiment (not depicted), the spring 116a may comprise a combination of multiple types of springs; for example, the spring 116a may comprise different discrete spring portions, with some of those spring portions being coil springs and some of those spring portions being cantilevered springs. In another different embodiment (not depicted), the spring 116a may not be located along the portion of the bottom wall 104b that delimits the cell compartment 124; for example, the spring 116a may be affixed directly to one or both of the bottom left and bottom right corner carrier coupling mechanisms, or may be affixed to another portion of the cell carrier 100 not depicted in the current embodiment. Additionally, while in the depicted embodiment the spring 116a extends past the periphery of the cell compartment 124 by virtue of extending below the bottom wall 104b, in another different embodiment (not depicted), the spring 116a may not extend past the periphery of the cell compartment 124. For example, the spring 116a may extend within the cell compartment 124 (e.g., be connected to any of the walls 104a-d and extend towards the interior of the cell compartment 124), and the stack assembly enclosure may be shaped so that it nonetheless compresses the spring 116a when the entire battery module is assembled.

Figure 1C:
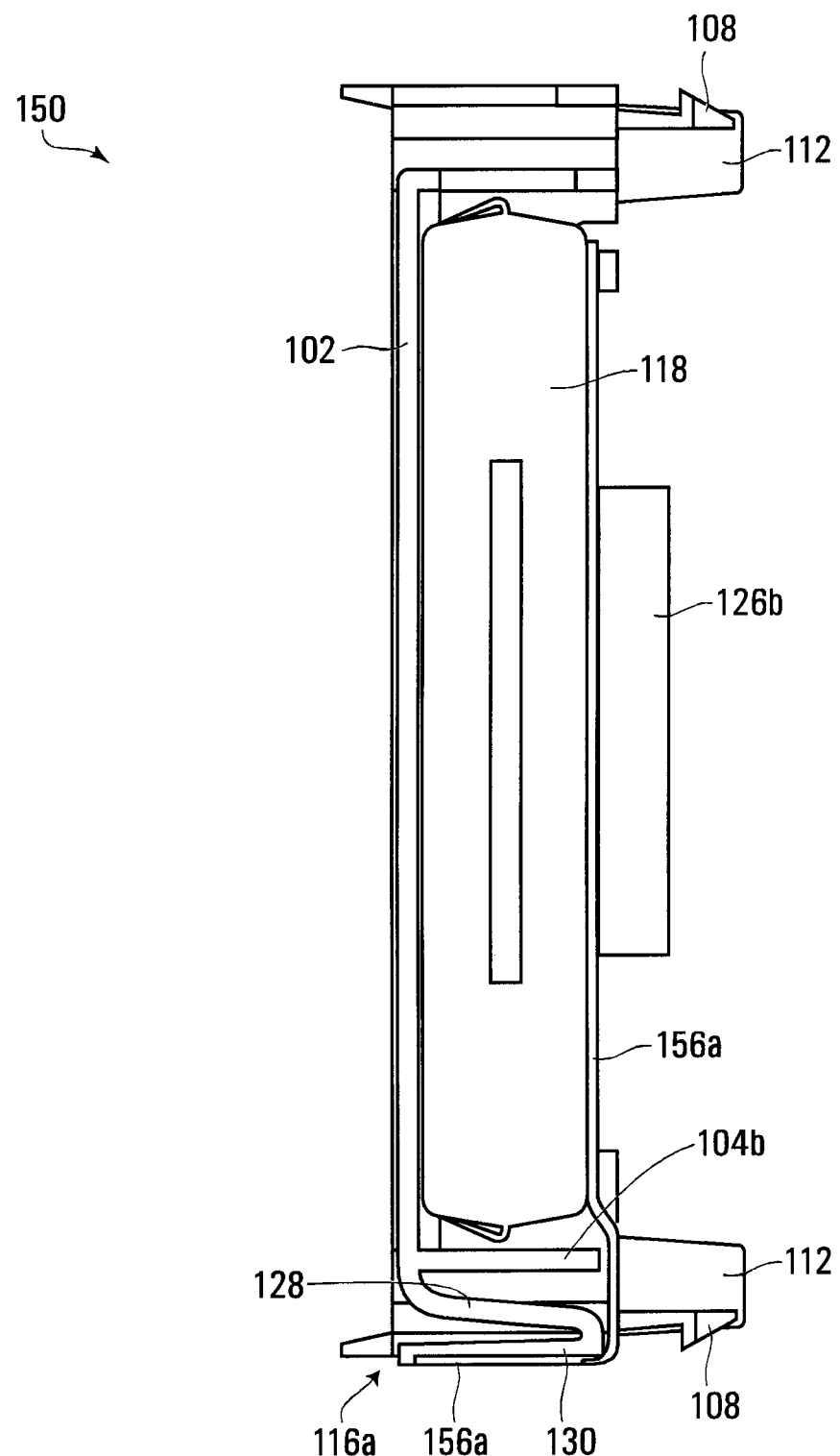
FIG. 1C is a sectional view of one example embodiment of a cell carrier assembly comprising the cell carrier of FIG. 1A.

FIG. 1C shows a sectional view of a cell carrier assembly 150 comprising the cell carrier 100 shown in FIGS. 1A and 1B. The cell carrier assembly 150 also comprises the pouch cell 118 and a first heat conductive sheet 156a which, in the depicted embodiment, comprises graphite. The pouch cell 118 is laid directly in the cell compartment 124, and the cell's 118 left and right tabs extend into the first and second tab compartments 120a,b, respectively. The heat conductive sheet 156a is laid directly on the front side of the cell 118, extends out of the cell compartment 124, over the bottom wall 104b, and under the actuator portion 130 of the spring 116a.

As discussed in more detail below, the heat conductive sheet 156a is accordingly able to conduct heat away from the cell 118, and by virtue of being compliant the spring 116a facilitates contact of the heat conductive sheet 156a with an external heat sink, thereby facilitating heat transfer away from the cell 118.

Figure 3:
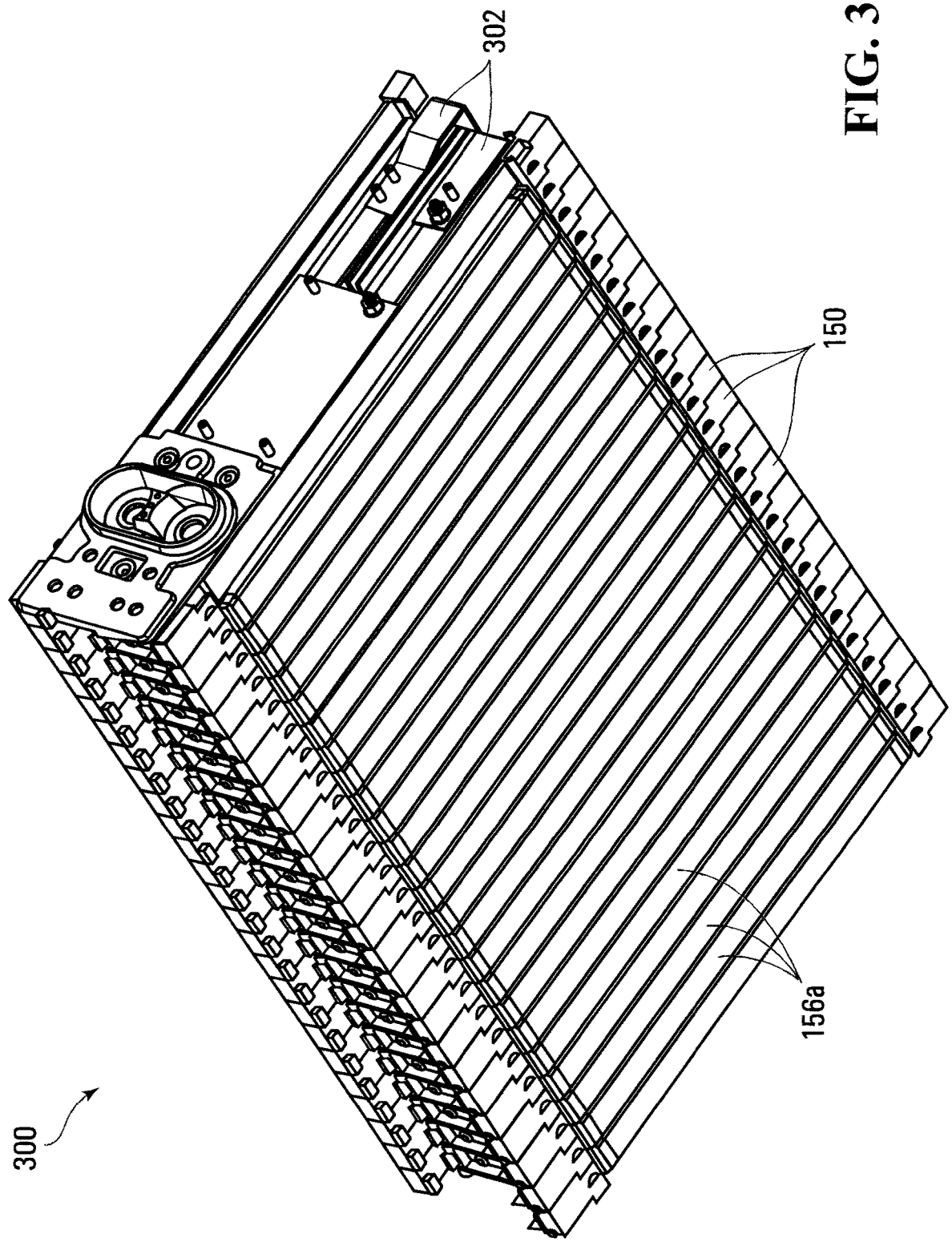
FIG. 3 is a perspective view of a stack assembly comprising a stack of connected cell carrier assemblies, with each of the cell carrier assemblies being of the embodiment shown in FIG. 1C.

Referring now to FIG. 3, there is depicted a stack assembly 300 comprising 24 of the cell carrier assemblies 150 mechanically coupled together in series using the cell carriers' 100 carrier coupling mechanisms, as described above. Bus bars 302 electrically couple the cells 118 together in any suitable electrical configuration; for example, in the depicted embodiment the cells 118 are electrically coupled in a 12s2p arrangement. As described above in respect of the cell carrier assembly 150, portions of the heat conductive sheets 156a extend under the cell carrier assemblies 150.

Figure 5B:
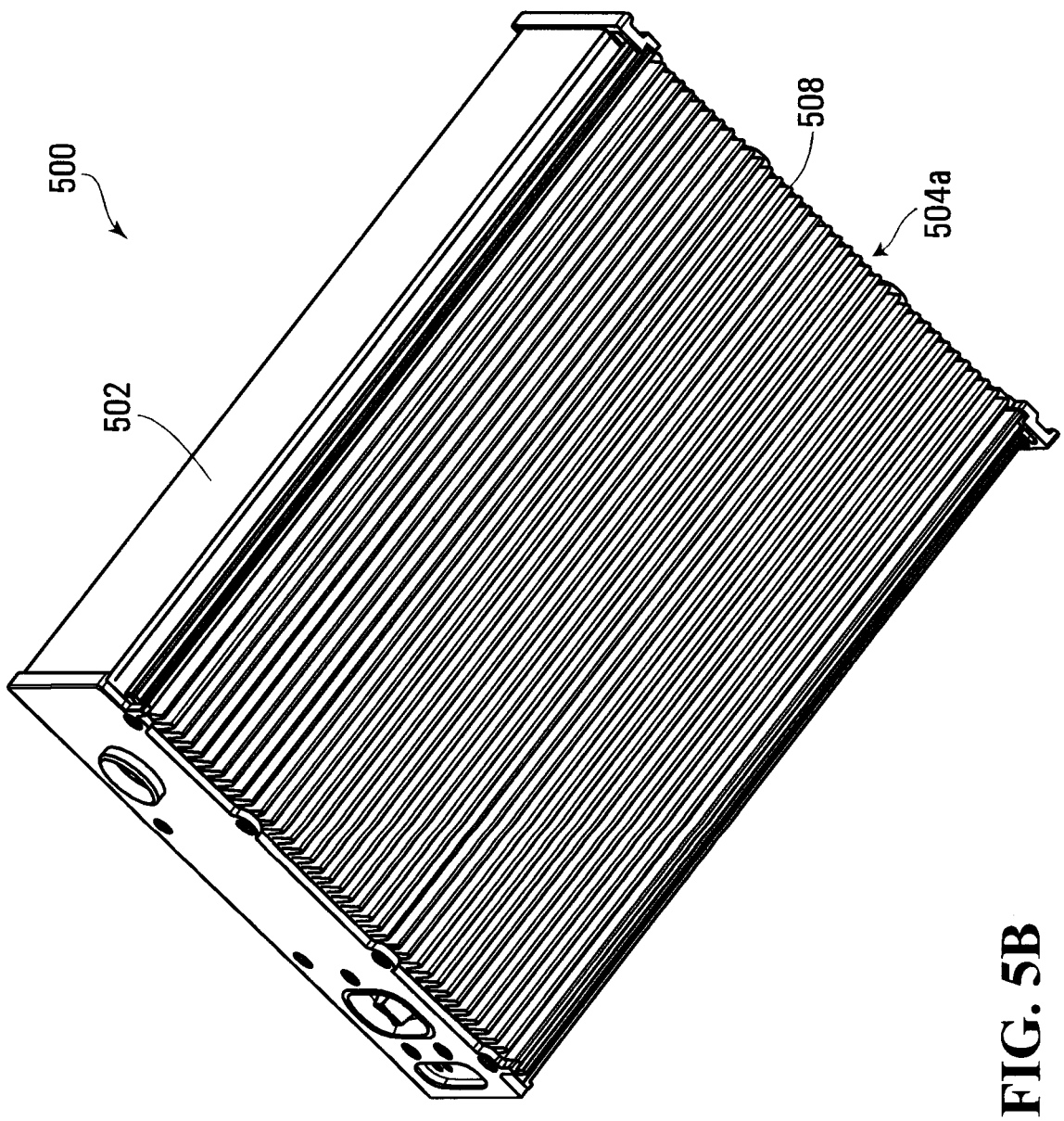
FIG. 5B is a bottom perspective view of the stack assembly enclosure of FIG. 5A.
Figure 5C:
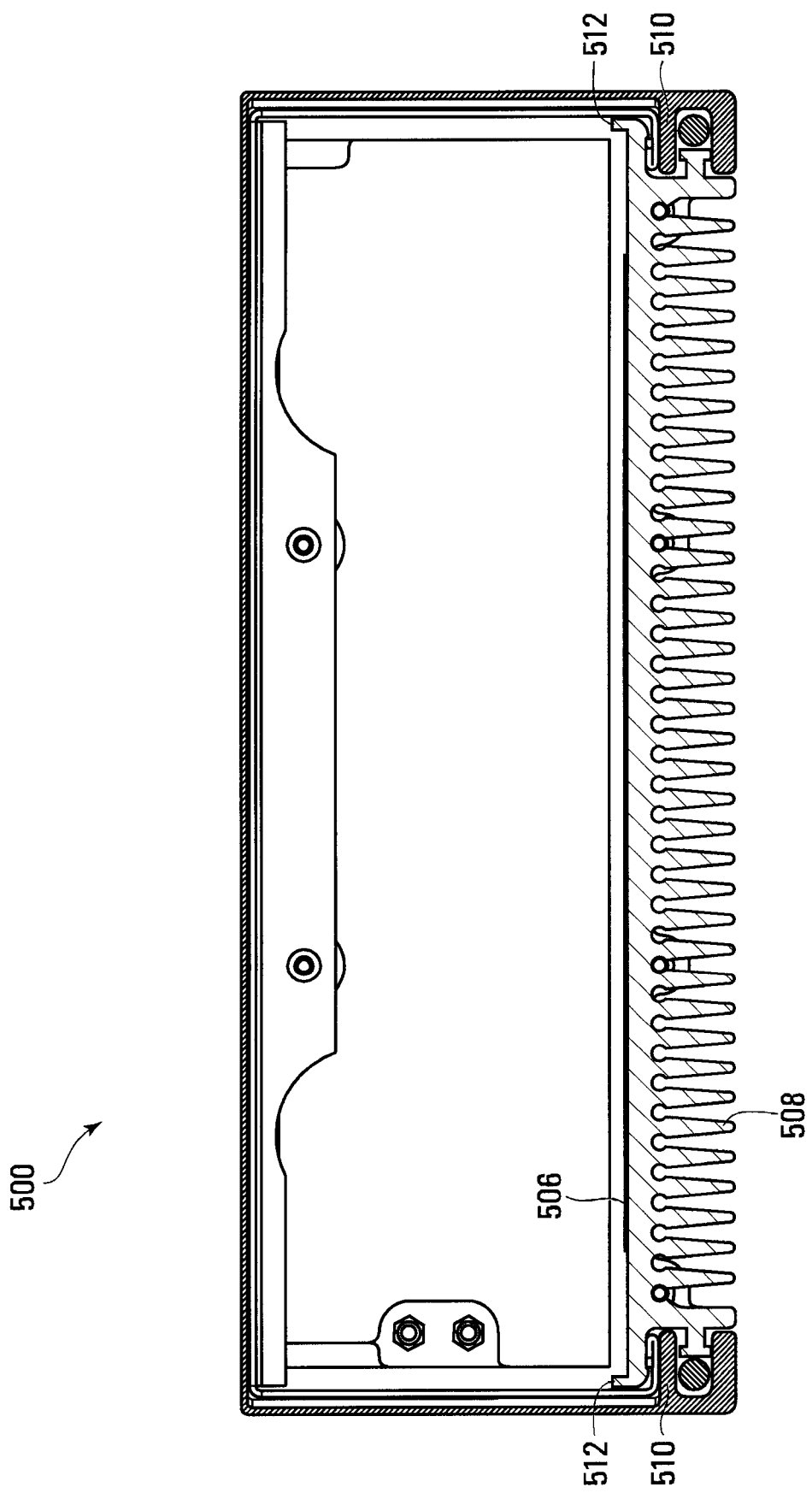
FIG. 5C is a sectional view of the stack assembly enclosure of FIG. 5A taken along line 5C-5C of FIG. 5A.
Figure 5D:
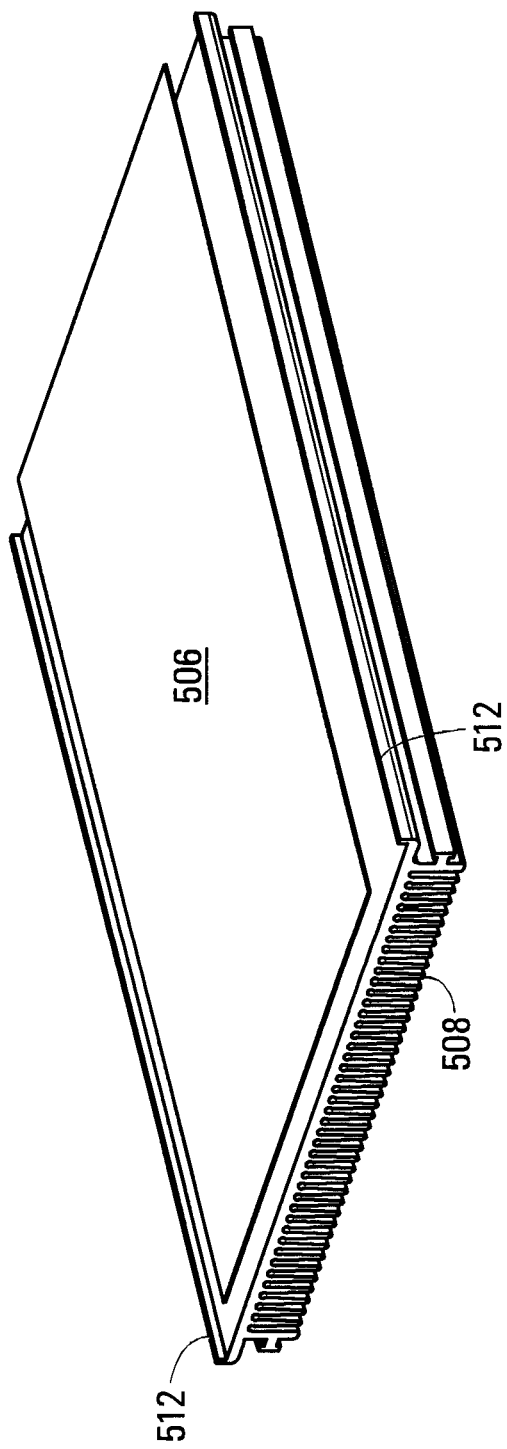
FIG. 5D is an exploded view of a heat sink comprising part of the enclosure of FIG. 5A.

Referring now to FIGS. 5A to 5D, FIGS. 5A and 5B depict top and bottom perspective views, respectively, of one embodiment of a stack assembly enclosure 500 for housing the stack assembly 300 of FIG. 3, FIG. 5C is a sectional view of the enclosure 500 of FIG. 5A taken along line 5C-5C of FIG. 5A, and FIG. 5D is an exploded view of a first heat sink 504a comprising part of the enclosure of FIG. 5A. The enclosure of FIGS. 5A to 5C comprises a housing 502 and the first heat sink 504a, with the heat sink 504a comprising a thermal interface layer ("TIM") 506 on a finned cooling plate 508. The TIM 506 may be, for example, a material from Saint Gobain Ceramic Material S™, T-Global Technology™, or 3M Company™. The conductivity of the TIM 506 may be, for example, between 1 and 3 W/mK. Various manufacturing techniques may be used to make the housing 502 and cooling plate 502; for example, the housing 502 may be made of sheet metal as depicted in FIGS. 5A to 5C or alternatively be extruded, and the cooling plate 508 may be extruded, as depicted in FIGS. 5A to 5C. The housing 502 has a pair of lower lips 510 and the cooling plate 508 has a pair of upper lips 512 that are matable to each other to connect the housing 502 and the heat sink 504a. More particularly, in embodiments in which the housing 502 is manufactured from a resilient material such as metal, the housing 502 may be flexed from an unbiased position to increase the distance between the lower lips 510, then be placed over the cooling plate's 508 upper lips 512, and then be released to allow the resilient material from which the housing 502 is made to restore the housing 502 to its unbiased position, thereby locking the lower lips 510 over the cooling plate's 508 upper lips 512.

In the depicted embodiment, the stack assembly 300 may be placed on the heat sink 504a prior to the housing 502 being secured to the heat sink 504a, and the positions of the lips 510,512 may be selected so that the housing 502 acts as a compression mechanism to compress the stack assembly 300 into the heat sink 504a. More specifically, the positions of the lips 510,512 may be selected so that the top surface of the housing 502 applies force against the top surface of the stack assembly 300 when the lips 510,512 are locked together, thereby biasing the springs 116a of the stack assembly 300 against the heat sink 504a and facilitating heat conduction from the stack assembly 300 to the heat sink 504a via the assembly's 300 conductive sheets 156a. In this embodiment, the housing's 502 side walls are in tension while the housing 502 compresses the stack assembly 300. The amount of compression may vary with the embodiment; however, in the depicted embodiment 116a the housing 502 compresses the springs 116a of the stack assembly 300 by approximately 1 mm.

Different embodiments of the enclosure 500 are possible. For example, in one different embodiment (not depicted), the housing 502 and cooling plate 508 may be integral with each other and be manufactured via a single extrusion.

Additionally or alternatively, the stack assembly 300 may be inserted into the enclosure 500 using sliders, and the compression mechanism used to adjust the vertical position of the stack assembly 300 within the enclosure 500 may comprise part of the enclosure 500 and be located above the stack assembly 300. For example, the compression mechanism may comprise one or more clamping cams that, when rotated (e.g., by one-quarter turn using an appropriate tool such as a socket wrench), bring the cams into contact with the top of the stack assembly 300 and forces the stack assembly 300 downwards into the heat sink 504a. The cams may then be locked into place to prevent further vertical movement of the stack assembly 300.

The compression of the stack assembly 300 biases the springs 116a of the cell carriers 100 comprising the cell carrier assembly 150 (e.g., by 1 mm as noted above), thereby pushing the heat conductive sheets 156a into the heat sink 504a and facilitating heat dissipation by creating and improving thermal conduction pathways from the cells 118 to the heat sink 504a.

In additional different embodiments (not depicted), additional cams may be placed on the inside top surface of the housing 502 at positions corresponding to positions on the stack assembly 300 where additional heat transfer to the heat sink 504a is desired. Additionally or alternatively, the compression mechanism may comprise any one or more of a non-camming clamp, a band whose ends are fastened to the heat sink 504a and that is wrapped around the stack assembly 300, and threaded tie rods that span the heat sink 504a and the top of the housing 502 and accompanying nuts.

The embodiment of the heat sink 504a in FIGS. 5A to 5D comprises the TIM 506 and the cooling plate 508. The TIM 506 provides a compliant interface between the stack assembly 300 and the cooling plate 508, thereby facilitating conductive heat transfer. In one embodiment, the TIM 506 has a thickness of anywhere between 0.5 mm and 2 mm. In one embodiment, the side of one or both of the TIM 506 and the cooling plate 508 that faces the stack assembly 300 has an area that is at least as large as the area of the side of the stack assembly 300 that faces the TIM 506. In the depicted example embodiment, the heat sink 504a has a thermal mass of approximately 15,000 J/K.

In another embodiment (not depicted), the heat sink 504a may further comprise an additional TIM and a heat spreader/capacitor (hereinafter referred to simply as a "heat spreader") in order to create a more uniform temperature distribution across the surface of the heat sink 504a, thereby decreasing the maximum heat flux required to be drawn from the heat sink 504a to ensure a safe operating temperature for the stack assembly 300. Instead of the stack assembly 300 being compressed directly against the TIM 506, which directly contacts the cooling plate 508, in this other embodiment the stack assembly 300 is compressed directly against the TIM 506, which directly contacts the heat spreader. The heat spreader is compressed directly against the additional TIM, and the additional TIM directly contacts the cooling plate 508. The ratio of the heat spreader's in-plane thermal conductivity to its through-plane thermal conductivity is higher than that of the TIMs; accordingly, the heat gradient across the bottom surface of the stack assembly 300 and the top surface of the heat sink 504a is reduced. In this example embodiment, each of the TIMs has a thermal conductivity of between 1 and 3 W/mK and a thickness of 0.5 mm to 2 mm. The heat spreader has a thermal conductivity of between 100 and 300 W/mK or higher and a thickness of approximately two to five times that of each of the TIMs. The thermal mass of the heat spreader is selected to be relatively high so as to be able to absorb spikes in heat generation resulting, for example, from the stack assembly 300 experiencing thermal runaway or from high C charging or discharging. In one example embodiment, each of the TIMs is 1 mm thick and has a thermal conductivity of 3 W/mK, and the heat spreader comprises aluminium and is 5 mm thick.

In another embodiment (not depicted), the cooling plate 508 comprises conduits within the cooling plate 508 that contain a phase change material. The conduits may extend in an in-plane direction, a through-plane direction, or both (e.g., diagonally through the cooling plate 508). In another embodiment (not depicted), the cooling plate 508 may additionally or alternatively comprise phase change heat pipes extending in a through-plane direction or in both a through-plane and in-plane direction (e.g., diagonally through the cooling plate 508); these heat pipes may be pressed into the top surface of the cooling plate 508, be inserted through conduits extending through or along the cooling plate 508, or both. For example, in an embodiment in which there is a thermal gradient across the heat sink 504a (e.g., the heat sink 504a may be air cooled), the heat pipes may serve to redistribute heat throughout the heat sink 504a.

Figure 2A:
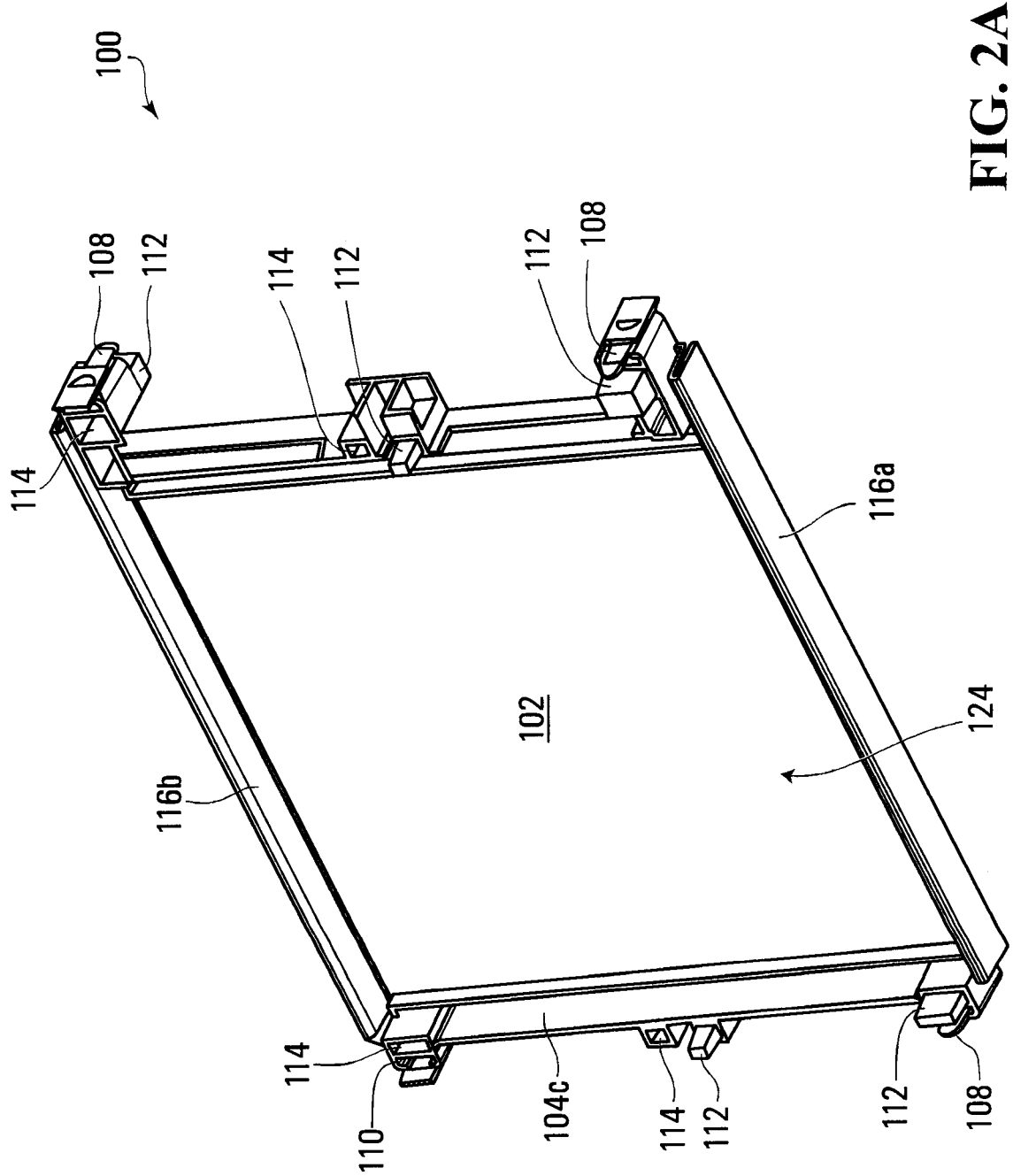
FIG. 2A is a front perspective view of one example embodiment of a cell carrier.
Figure 2B:
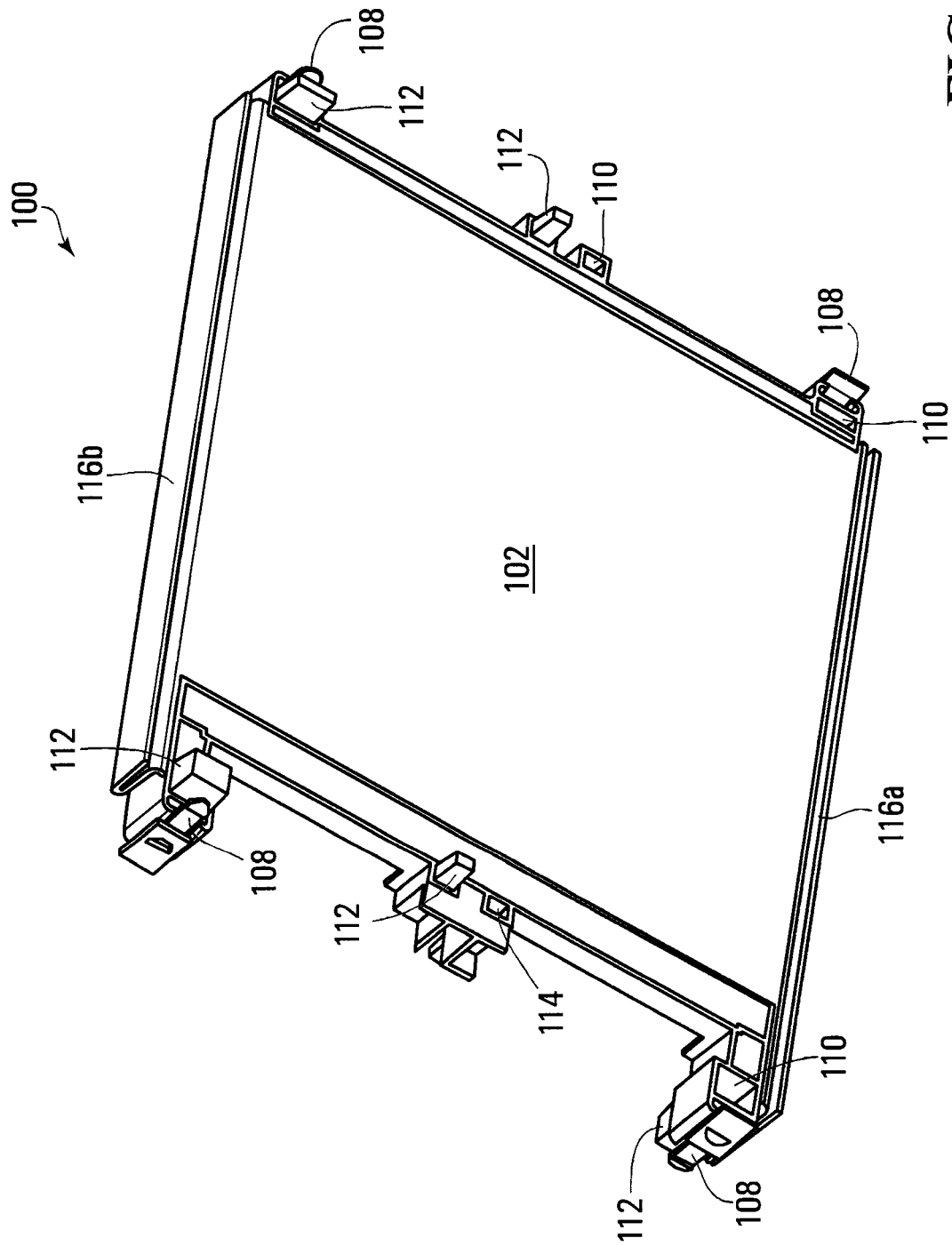
FIG. 2B is a rear perspective view of the cell carrier of FIG. 2A.

Referring now to FIGS. 2A and 2B, there are respectively shown front perspective and rear perspective views of another embodiment of the cell carrier 100. As with the embodiment of the cell carrier 100 shown in FIGS. 1A to 1C, the cell carrier 100 comprises the backing 102 to which the pouch cell 118 (shown in FIG. 2C) is affixed using, for example, an adhesive. The cell carrier 100 also comprises the top wall 104a extending along the backing's 102 top edge, the bottom wall 104b extending along the backing's 102 bottom edge, the left wall 104c extending across a left portion of the backing 102, and a right wall 104d extending along a right portion of the backing 102, to collectively delimit the cell compartment 124 for receiving the pouch cell 118.

A rightmost wall 122b extends along the backing's 102 right edge, and the rightmost wall 122b, right wall 104d, top wall 104a, and bottom wall 104b collectively delimit the tab compartment 120 that is positioned to receive the cell's 118 foil tabs. In contrast to the embodiment of FIGS. 1A to 1G, the cell carrier 100 of FIGS. 2A to 2G uses the same tab compartment 120 to receive both of the cell's 118 tabs.

Similar to the cell carrier 100 of FIGS. 1A and 1B, the cell carrier 100 of FIGS. 2A and 2B also comprises carrier coupling mechanisms for coupling the cell carrier 100 to a neighboring cell carrier 100 located in front of or behind the cell carrier 100. The two carrier coupling mechanisms connected to the top corners of the carrier 100 ("top corner carrier coupling mechanisms") are identical. Each of these carrier coupling mechanisms comprises a tab 108 extending rearwardly and an adjacent slot 110 with a notch in its side wall to detachably couple to the tab 108 of a neighboring cell carrier 100. To the right of the tab 108 and slot 110 is a forwardly opening recess 114 and a rearwardly extending protrusion 112 for receiving and forming an interference fit with the protrusion 112 and recess 114 of a neighboring cell carrier 100. The top left and top right corner carrier coupling mechanisms are identical and mirror each other except that the protrusion 112 and recess 114 of the top right corner carrier coupling mechanism are larger than those of the top left corner carrier coupling mechanism. The top left and bottom left corner carrier coupling mechanisms are identical except the positions of the protrusion 112 and recess 114 are swapped, and the top right and bottom right corner carrier coupling mechanisms are identical except the positions of the protrusion 112 and recess 114 are swapped. Another pair of forwardly and rearwardly facing recesses 114 and forwardly and rearwardly facing protrusions 112 are located at approximately the midpoint of the left and right edges of the cell carrier 100 to form an interference fit with the corresponding recesses 114 and protrusions 112 of neighboring cell carriers 100.

The cell carrier 100 of FIGS. 2A and 2B comprises the first spring 116a, similar to the cell carrier 100 of FIGS. 1A and 1B. The cell carrier 100 of FIGS. 2A to 2B also comprises a second spring 116b whose construction mirrors that of the first spring 116a. More specifically, in the depicted embodiment, the second spring 116b comprises a curved cantilevered portion 128 that is affixed at one end to the outer surface of the top wall 104a. A substantially flat actuator portion 130 is affixed to the other end of the cantilevered portion 128 at a flexible fulcrum and is designed to be compressed by virtue of contact with the stack assembly enclosure, as discussed in more detail below. In various embodiments, the construction of the second spring 116b may vary in a manner analogous or identical to the various embodiments of the first spring 116a as described above in respect of FIGS. 1A and 1B. For example, as described with respect to the first spring 116a above, the second spring 116b may in some embodiments extend past the periphery of the cell compartment 124 as depicted, and in some embodiments may not. Furthermore, while the first and second springs 116a,b are shown as being of identical design in the depicted embodiment, in different embodiments (not depicted), the springs 116a,b may be differently constructed. For example, the first spring 116a may be a cantilevered spring while the second spring 116b may be a coil spring.

Figure 2C:
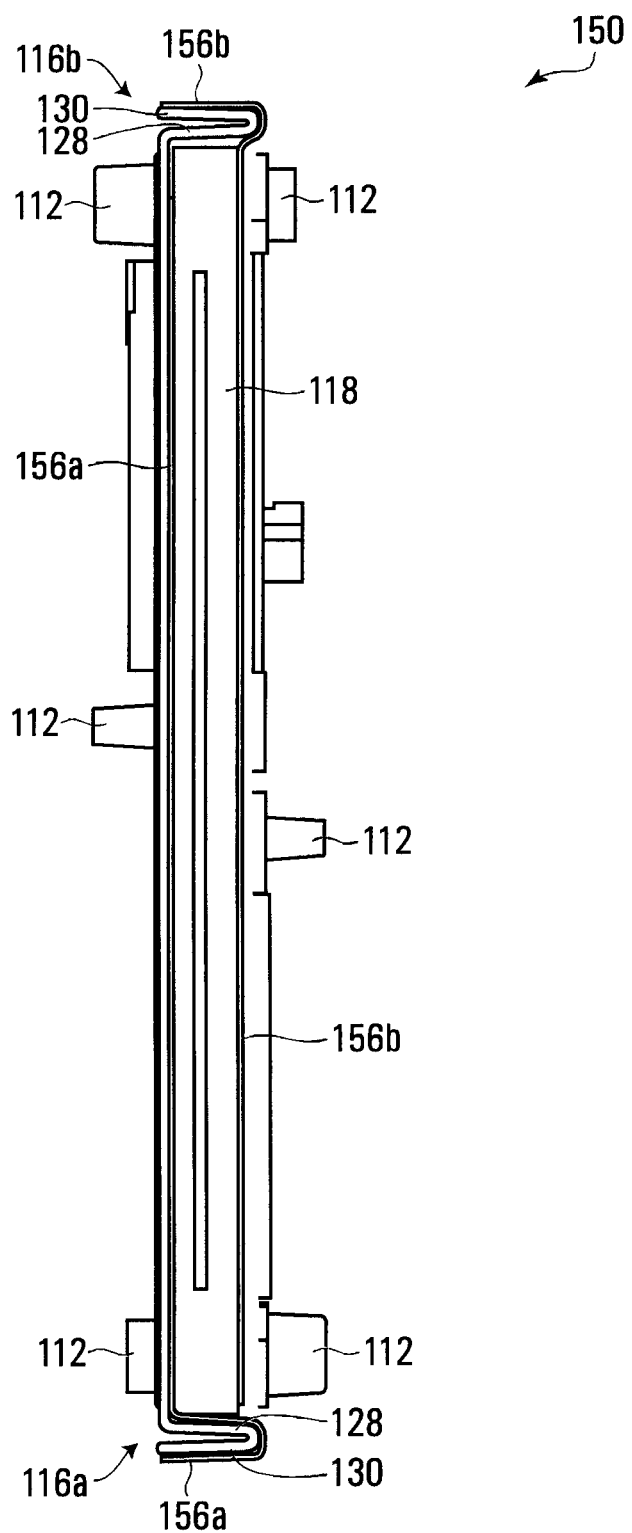
FIG. 2C is a sectional view of one example embodiment of a cell carrier assembly comprising the cell carrier of FIG. 2A.

Referring now to FIG. 2C, there is shown a sectional view of the cell carrier assembly 150 comprising the cell carrier 100 of FIGS. 2A and 2B. The cell's 118 tabs, which extend out of the cell compartment 124 and over the right wall 104d into the tab compartment 120. In FIG. 2C, the first conductive sheet 156a is laid directly in the cell compartment 124 and the cell 118 is laid on the first conductive sheet 156a. The first conductive sheet 156a extends out of the cell compartment 124, over the bottom wall 104b, and over the actuator portion 130 of the first spring 116a. The second conductive sheet 156b is laid directly on the side of the cell 118 facing away from the carrier 100, extends out of the cell compartment 124, over the top wall 104a, and over the actuator portion 130 of the second spring 116b.

While in the depicted embodiment the first and second conductive sheets 156a,b are identical, different embodiments the sheets 156a,b may differ. For example, the sheets 156a,b may be of different types, dimensions, or both. Furthermore, while in the depicted embodiment the first sheet 156a is laid between the cell carrier 100 and the cell 118 and extends over the second spring 116b, which is located on the top of the carrier 100, and the second sheet 156b is laid on an opposing side of the cell 118 that faces outwards and extends over the first spring 116a, which is located on the bottom of the carrier 100, in different embodiments (not depicted) the positioning of the sheets 156a,b may be changed. For example, in one different embodiment the first sheet 156a may extend over the bottom of the carrier 100 and the second sheet 156b may extend over the top of the carrier 100. In another different embodiment, both of the sheets 156a,b may extend over the same side of the carrier 100. Additionally or alternatively, one or both sheets 156a,b may be enlarged so that they extend over different sides of the carrier 100. Also additionally or alternatively, one or more additional sheets may be added to the carrier assembly 150.

Figure 4:
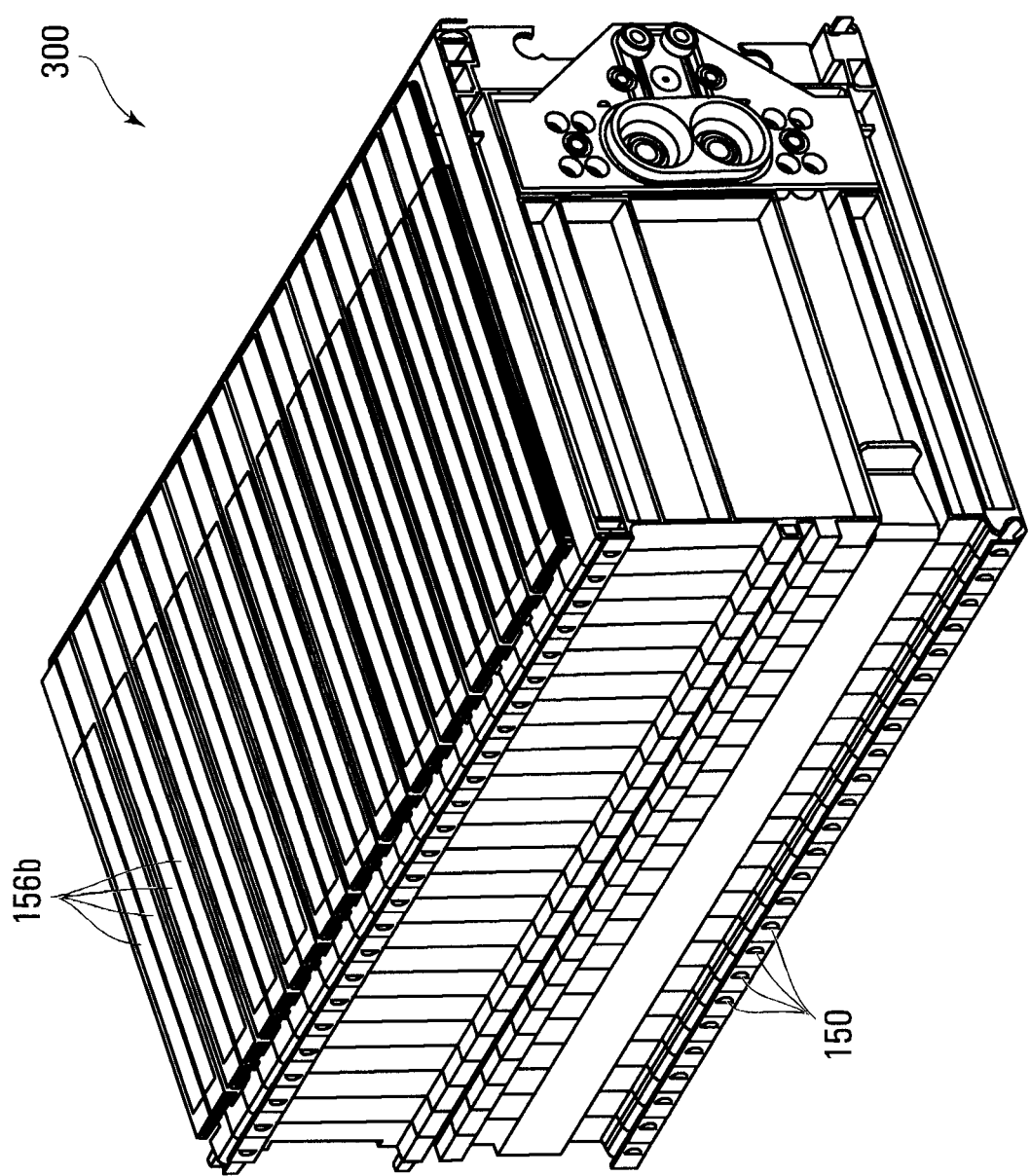
FIG. 4 is a perspective view of a stack assembly comprising a stack of connected cell carrier assemblies, with each of the cell carrier assemblies being of the embodiment shown in FIG. 2C.

Referring now to FIG. 4, there is depicted a stack assembly 300 comprising 24 of the cell carrier assemblies 150 depicted in FIG. 2C, mechanically coupled together in series using the cell carriers' 100 carrier coupling mechanisms, as described above. The portions of the first sheet 156a that extend over the tops of the carriers 100 are visible in FIG. 4; while not shown in FIG. 4, as described above portions of the second sheet 156b also extend under the bottoms of the carriers 100.

Figure 6A:
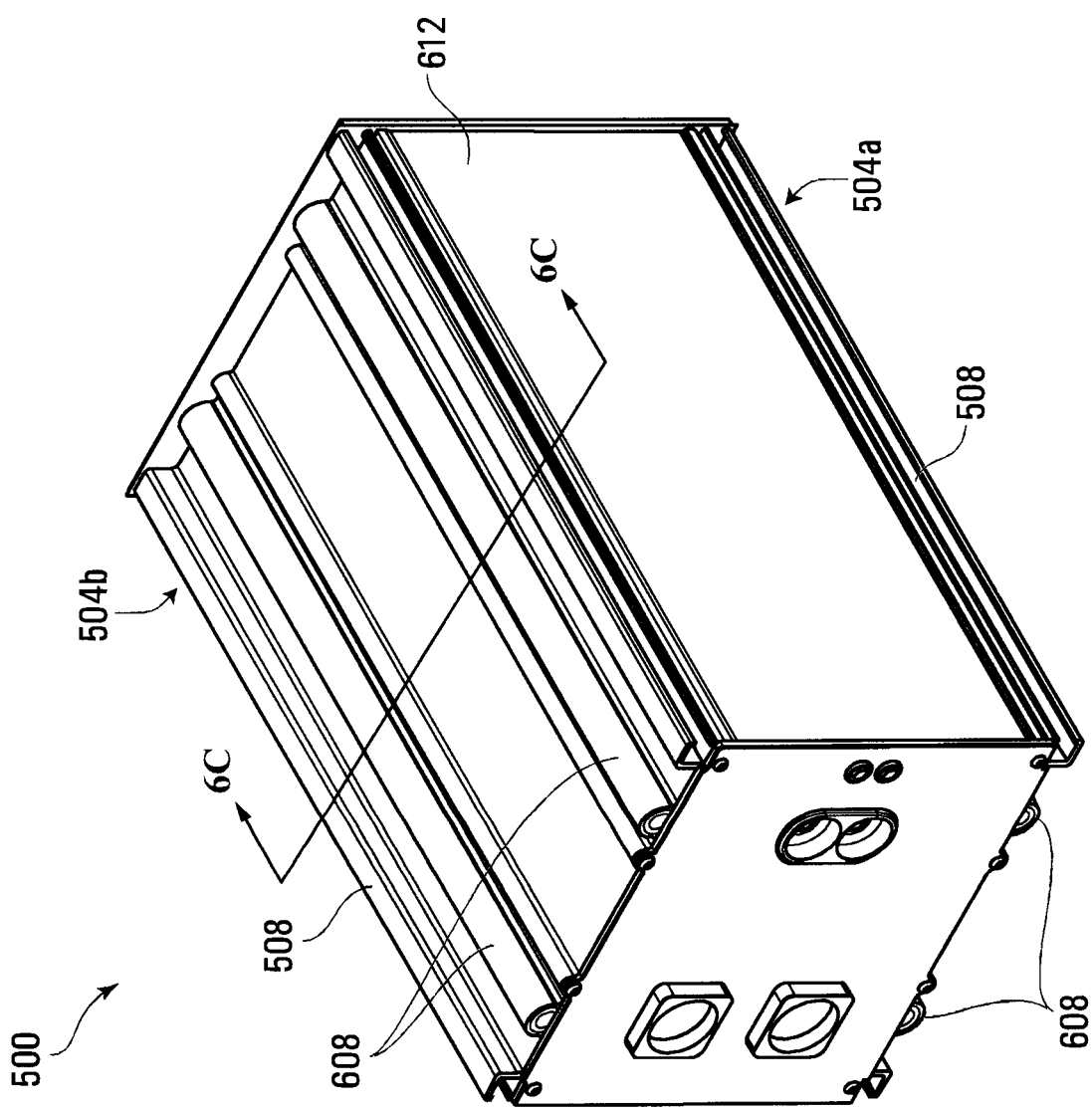
FIG. 6A is a top perspective view of one example embodiment of a stack assembly enclosure for use with the stack assembly of FIG. 4.
Figure 6B:
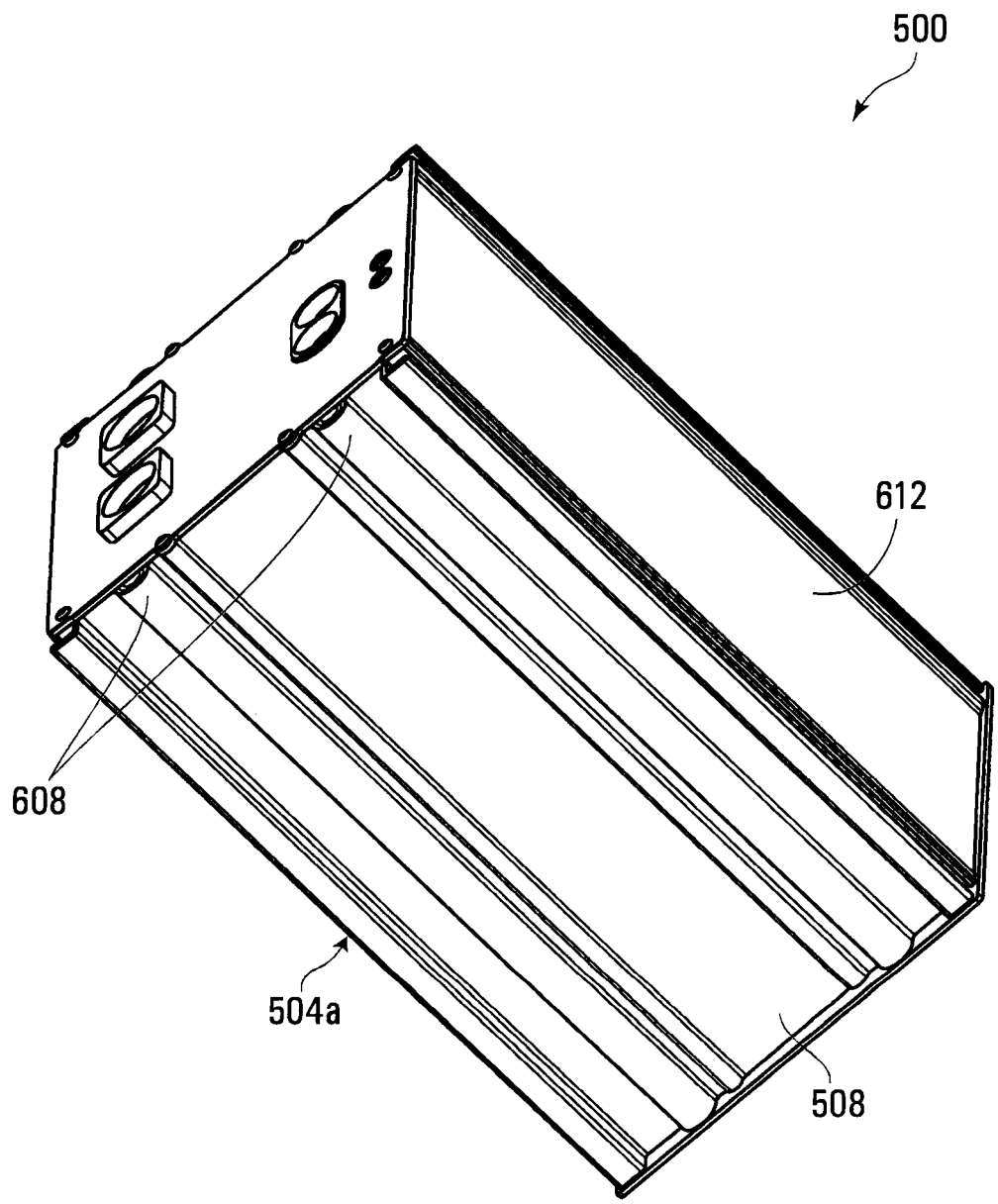
FIG. 6B is a bottom perspective view of the stack assembly enclosure of FIG. 6A.
Figure 6C:
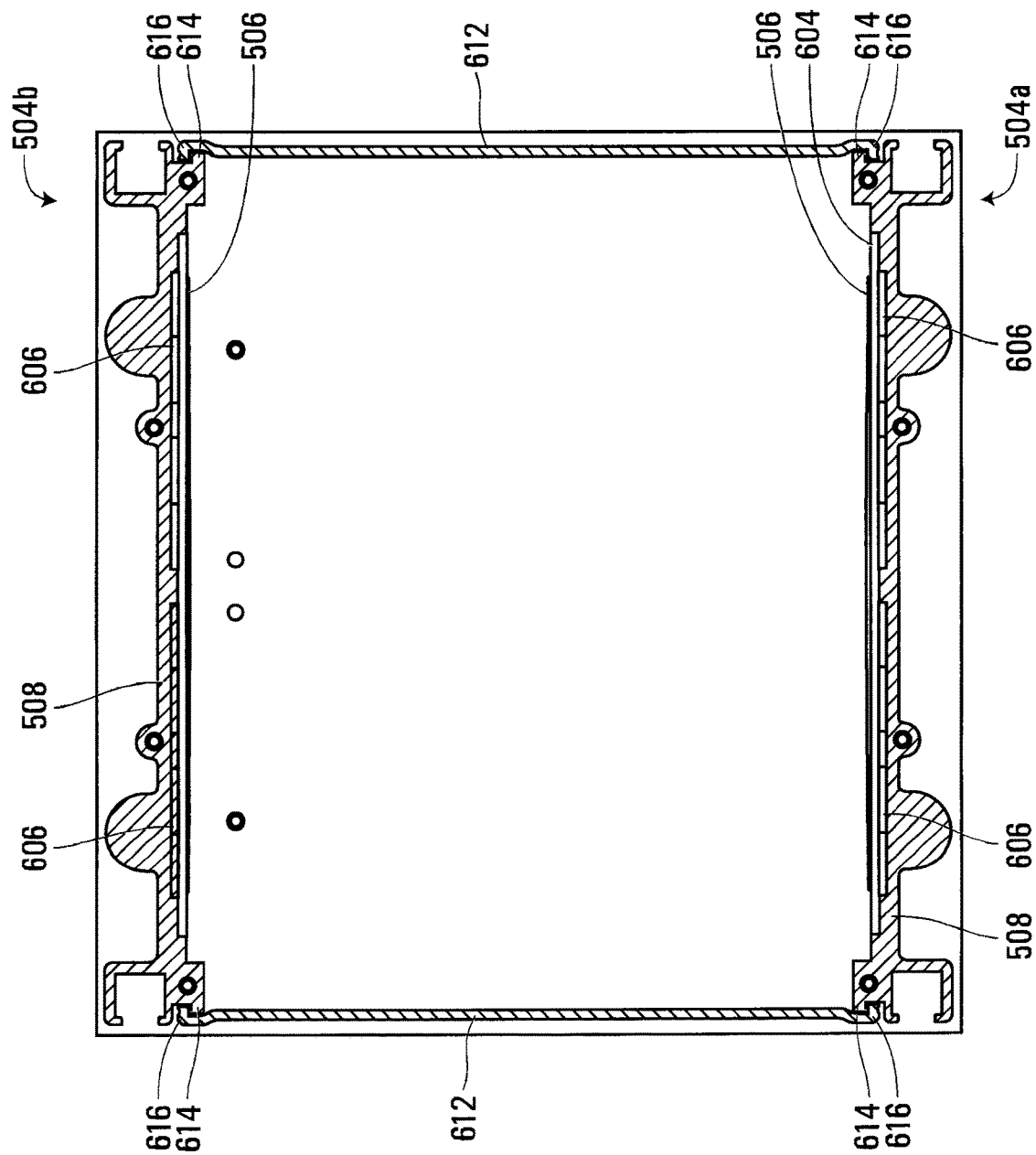
FIG. 6C is a sectional view of the stack assembly enclosure of FIG. 6A taken along line 6C-6C of FIG. 6A.
Figure 6D:
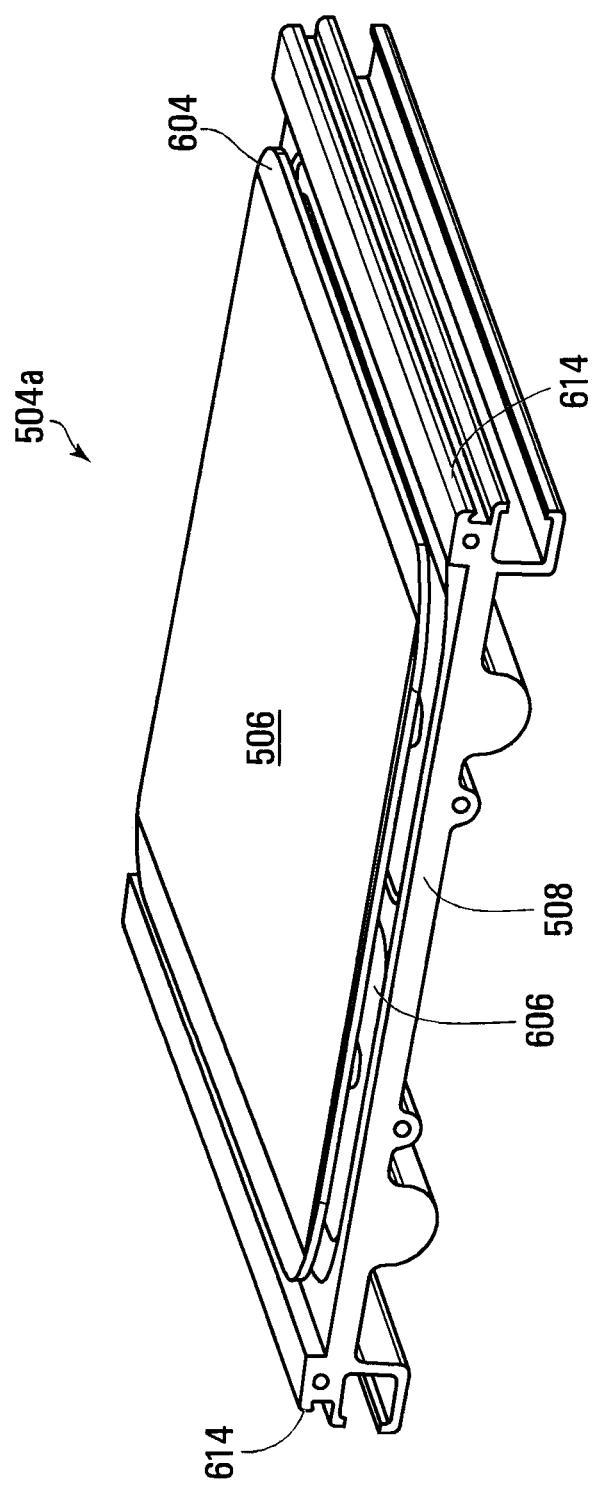
FIG. 6D is an exploded view of a heat sink comprising part of the enclosure of FIG. 6A.
Figure 6E:
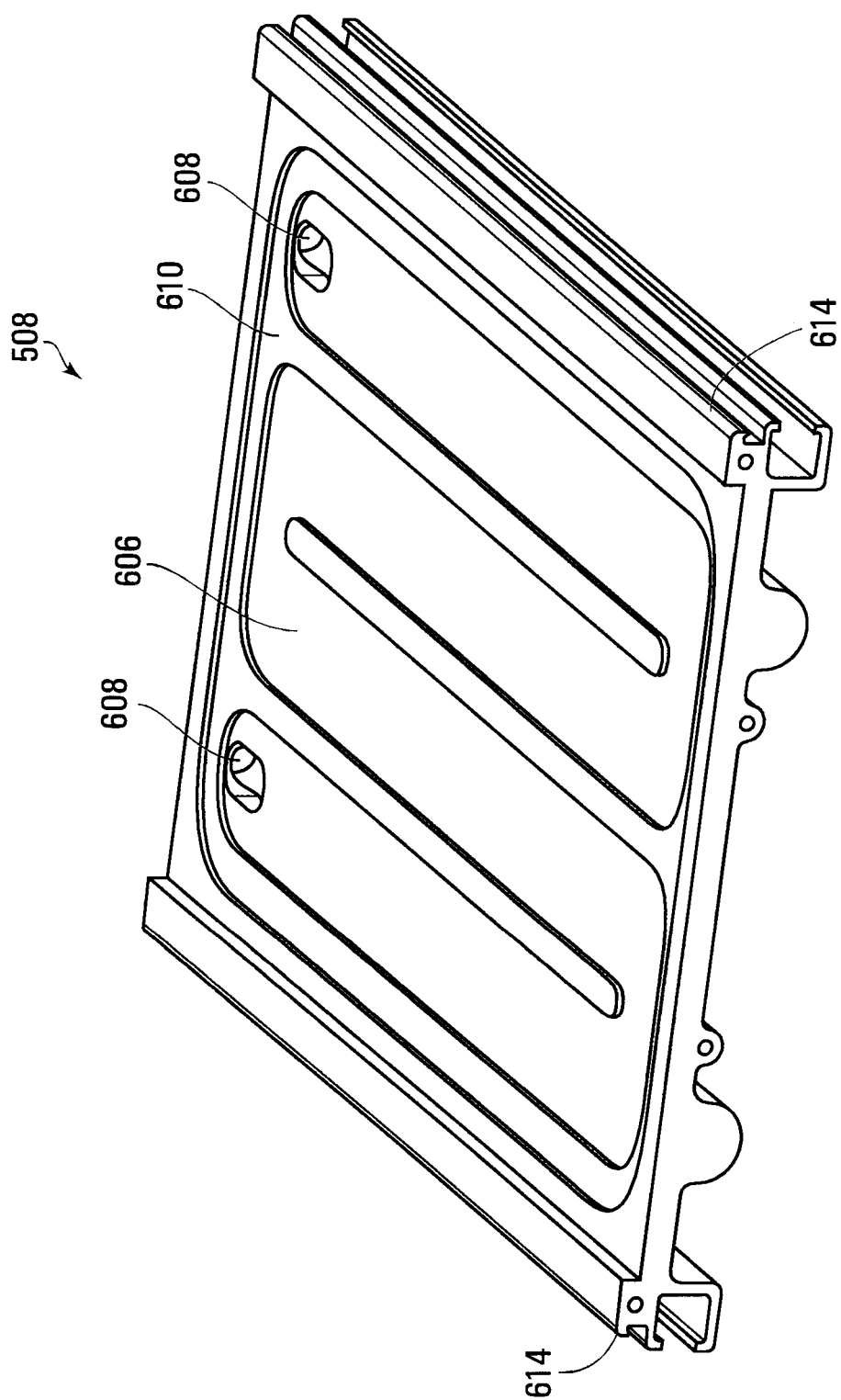
FIG. 6E is a perspective view of a cooling plate comprising part of the heat sink of FIG. 6D.

Referring now to FIGS. 6A to 6E, FIGS. 6A and 6B depict top and bottom perspective views, respectively, of one embodiment of the stack assembly enclosure 500 for housing the stack assembly 300 of FIG. 4, and FIG. 6C is a sectional view of the enclosure 600 of FIG. 6A taken along line 6C-6C of FIG. 6A. The enclosure 500 of FIGS. 6A to 6C comprises another embodiment of the first heat sink 504a on its bottom, a matching second heat sink 504b on its top, and compression plates 602 used as side walls. While in FIGS. 6A to 6C the first and second heat sinks 504a,b are identical, in different embodiments (not depicted) the first and second heat sinks 504a,b may differ; for example, the first heat sink 504a may be of the type shown in FIGS. 5A to 5C while the second heat sink 504a may be of the type shown in FIGS. 6A to 6C. FIG. 6D is an exploded view of the first heat sink 504a.

Each of the heat sinks 504a,b in FIGS. 6A to 6C comprises an embodiment of the cooling plate 508 that differs from the embodiment shown in FIGS. 5A to 5C (this cooling plate 508 is shown in isolation in FIG. 6E), a coolant sealing plate 604, and the TIM 506. The cooling plate 508 comprises a lip 610 recessed in the surface of the cooling plate 508 against which the stack assembly 300 rests. The cooling plate 508 further comprises a coolant conduit 606 recessed from the lip 610, with the ends of the conduit 606 fluidly coupled to coolant ports 608 accessible from the exterior of the enclosure 500. When the sealing plate 604 rests on and is sealed to the lip 610, a fluid tight seal is created between the coolant ports 608, thereby allowing a fluid (liquid or gas) coolant to be pumped from one of the ports 608 to the other of the ports 608. The sealing plate 604 may, for example, be welded or otherwise bonded to the lip 610.

In FIGS. 6A to 6D, the TIM 506 rests directly on the first heat sink 504a and the stack assembly 300 is compressed directly against the TIM 506 of the first heat sink 504 by the compression plates 602, which press the second heat sink 504b against the top of the stack assembly 300. To assemble the battery module, the stack assembly 300 is first placed on the first heat sink 504a and the second heat sink 504b is placed on the assembly 300. The second heat sink 504b is then pushed towards the first heat sink 504a, thereby compressing the springs 116a,b and consequently the assembly 300 sufficiently to permit the enclosure's 500 side walls comprising compression plates 612 to be attached to the first and second heat sinks 504a,b. More specifically, each of the longitudinally extending edges of the heat sinks 504a,b comprises a heat sink lip 614 and each of the longitudinally extending edges of the compression plates 612 comprises a compression plate lip 616 that is matable with a corresponding one of the heat sink lips 614. While the assembly 300 is being compressed, the compression plates 612 may either be slid longitudinally between the heat sinks 504a,b such that the heat sink and compression plate lips 614,616 interlock, or be flexed and laterally placed between the heat sinks 504a,b. Additionally or alternatively, the compression plates 612 and the heat sinks 504a,b may be secured differently. For example, the compression plates 612 and heat sinks 504a,b may be screwed together or otherwise secured using a different type of fastener.

The compression plates 612 are selected to have a height such that once the lips 614,616 are interlocked and the initial compression force applied to the second heat sink 504b is relieved to allow the stack assembly 300 to partially decompress, the compression plates 612 are placed under tension and accordingly continue to compress the stack assembly 300. In one example embodiment, the initial compression force applied to the second heat sink 504b prior to attaching the compression plates 612 to the heat sinks 504a,b is sufficient to compress the stack assembly 300 by approximately 2 mm to 3 mm. The compression plates 612 are selected to have a height that is slightly longer than the height of the compressed stack assembly 300 (e.g., a height of approximately 0.5 mm to 1 mm longer than that of the compressed stack assembly 300) so that once the compression plates 612 and heat sinks 504a,b are connected and the initial compression force is relieved, the assembly 300 presses against the compression plates 612, thereby securing the compression plates 612 relative to the heat sinks 504a,b. For example, in the embodiment in which the compression plates 612 have a height of approximately 0.5 mm to 1 mm greater than that of the compressed stack assembly 300, once the initial compression force is relieved and the compression plates 612 alone are responsible for the assembly's 300 compression, the assembly 300 is compressed by approximately 1.5 mm to 2.5 mm. By compressing the top and bottom of the stack assembly 300, the first and second springs 116a,b across the stack assembly 300 are compressed, contact is accordingly made across the entire top and bottom surfaces of the stack assembly 300 and the heat sinks 504a,b, and heat transfer from the stack assembly 300 to the heat sinks 504a,b via the conductive sheets 156a,b is promoted.

The various different embodiments described above in respect of the heat sink 504 depicted in FIGS. 5A to 5D are applicable to the heat sink 504 of FIGS. 6A to 6D as well, and vice-versa. For example, a finned cooling plate 508 such as the one shown in FIGS. 5A to 5D may be used in place of the cooling plate 508 depicted in FIGS. 6A to 6E (and vice-versa). As another example, channels that extend in an in-plane, through-plane, or both in-plane and through-plane (e.g., diagonally through the cooling plate 508) may be filled with a phase change material to facilitate heat absorption. As another example, in a different embodiment the heat sink 504 may comprise the depicted TIM 506 and an additional TIM and spreader plate. As another example, the coolant conduit 606 may be manufactured differently than as shown in FIGS. 6A to 6E; for example, the coolant conduit 606 may comprise any one or more of a pressed-in tube, drilled and capped holes throughout the length of the cooling plate 508, a brazed assembly, and a gasketed assembly.

While the raised edge 104 in the depicted embodiments entirely delimits the cell compartment and is continuous and linear, in different embodiments (not depicted) the raised edge 104 may delimit only a portion of the cell compartment, may be discontinuous, may be non-linear, or any combination thereof.

Directional terms such as "top", "bottom", "upwards", "downwards", "vertically", and "laterally" are used in this disclosure for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this disclosure are intended to include indirect and direct connections unless otherwise indicated. For example, if a first article is coupled to a second article, that coupling may be through a direct connection or through an indirect connection via another article. Also, a reference to a first material and a second material directly contacting or being in direct contact with each other includes the first material and the second material being directly adhered to each other, such as by using an adhesive layer.

Furthermore, the singular forms "a", "an", and "the" as used in this disclosure are intended to include the plural forms as well, unless the context clearly indicates otherwise.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A cell carrier, comprising:
    (a) a cell compartment for receiving a battery cell on a rigid backing of the cell compartment, the battery cell being a pouch cell; and
    (b) a first spring coupled to the cell compartment for biasing a portion of a first heat conductive sheet that is thermally coupled to the battery cell away from the cell and in contact with an external heat sink.

2. The cell carrier of claim 1 wherein the first spring extends past the periphery of the cell compartment.

3. The cell carrier of claim 1 wherein the cell compartment comprises:
    (a) a raised edge extending from the rigid backing and at least partially delimiting the cell compartment.

4. The cell carrier of claim 1 further comprising a second spring coupled to, and extending past the periphery of, the cell compartment, wherein the cell compartment has multiple sides and the first and second springs extend past different sides of the cell compartment.

5. The cell carrier of claim 1 wherein the first spring comprises a cantilevered spring.

6. The cell carrier of claim 5 wherein the first spring comprises:
    (a) a cantilevered portion affixed at one end to the cell compartment; and
    (b) an actuator portion affixed at another end of the cantilevered portion at a fulcrum.

7. The cell carrier of claim 4 wherein the second spring comprises a cantilevered spring, and optionally wherein the second spring extends continuously along a side of the cell compartment.

8. The cell carrier of claim 7 wherein the second spring comprises:
    (a) a cantilevered portion affixed at one end to the cell compartment; and
    (b) an actuator portion affixed at another end of the cantilevered portion at a fulcrum.

9. A cell carrier assembly, comprising:
    (a) the cell carrier of claim 1
    (b) a battery cell located within the cell compartment; and
    (c) a first heat conductive sheet thermally coupled to the battery cell and extending past the first spring.

10. The cell carrier assembly of claim 9 wherein the first heat conductive sheet directly contacts the battery cell.

11. The cell carrier assembly claim 9, when the cell carrier comprises the second spring, further comprising a second heat conductive sheet thermally coupled to the battery cell and extending past the second spring.

12. The cell carrier assembly of claim 11 wherein the second heat conductive sheet directly contacts the battery cell, and optionally wherein:
    (a) the second heat conductive sheet is between the cell carrier and the battery cell; or
    (b) the second heat conductive sheet is on a surface of the battery cell facing away from the cell carrier.

13. The cell carrier of claim 1 wherein the first spring extends continuously along a side of the cell compartment.

14. A battery module, comprising:
    (a) a stack assembly comprising multiple instances coupled together in series of the cell carrier assembly of claim 9;
    (b) a stack enclosure in which the stack assembly is contained, the stack enclosure comprising:
        (i) a housing;
        (ii) a heat sink coupled to the housing, wherein the stack assembly is positioned within the housing such that the first heat conductive sheet contacts the heat sink, wherein the heat sink comprises a layer of thermal interface material and a cooling plate thermally coupled to the layer of thermal interface material; and
        (iii) a compression mechanism that compresses the stack assembly against the heat sink such that the first spring of each of the cell carrier assemblies is biased against the heat sink.

15. The battery module of claim 14 wherein, when the stack assembly comprises the second heat conductive sheet and the second spring, the compression mechanism compresses the stack assembly against the heat sink such that the second spring of each of the cell carrier assemblies is biased against the heat sink, and optionally wherein the heat sink comprises a first heat sink and a second heat sink located on opposite sides of the stack enclosure.

16. The battery module of claim 14 wherein the compression mechanism comprises the side walls of the housing under tension.

17. The cell carrier assembly of claim 9 wherein:
    (a) the first heat conductive sheet is between the cell carrier and the battery cell; or
    (b) the first heat conductive sheet is on a surface of the battery cell facing away from the cell carrier.

* * * * *